March 1, 1966 G. L. SMITH 3,237,228
MEAT BRUSH AND CLEANER
Filed July 2, 1965 4 Sheets-Sheet 1
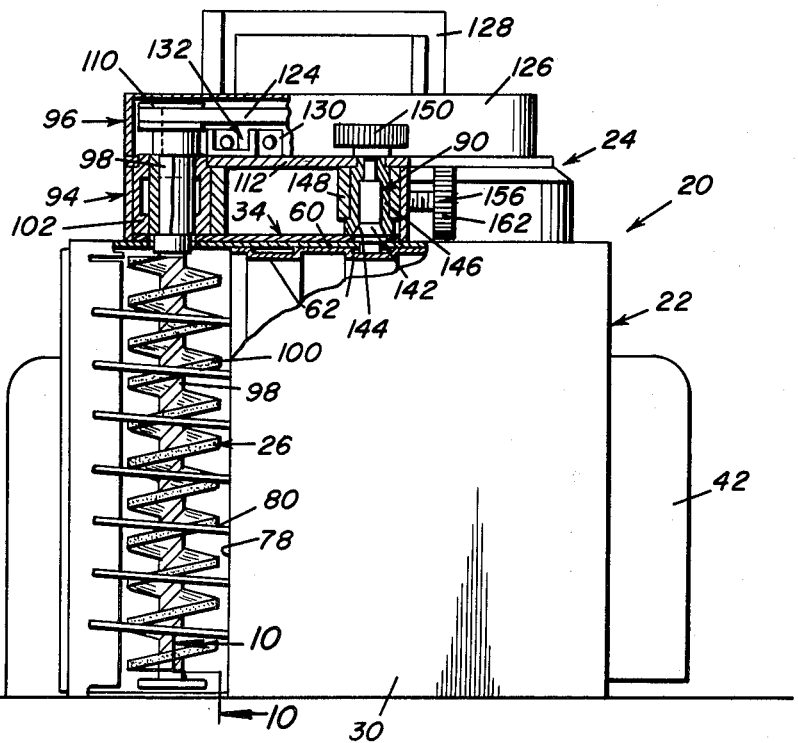
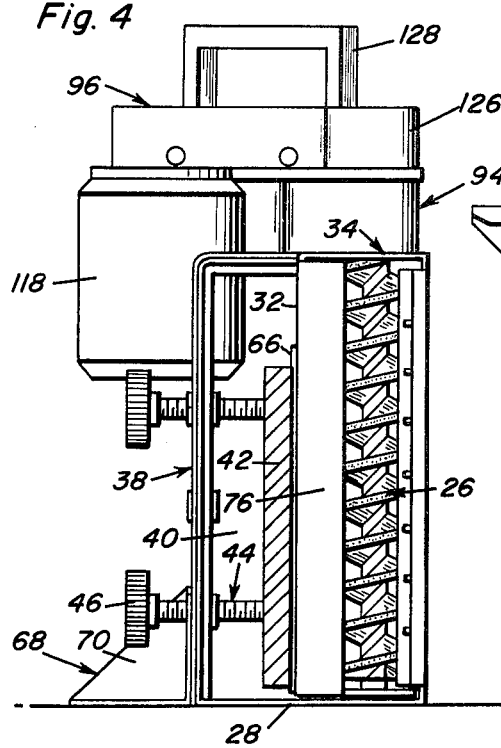
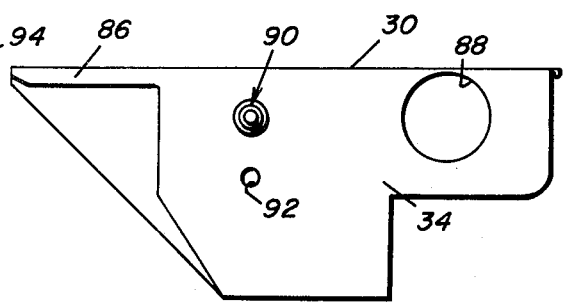
Gilbert L. Smith
INVENTOR.

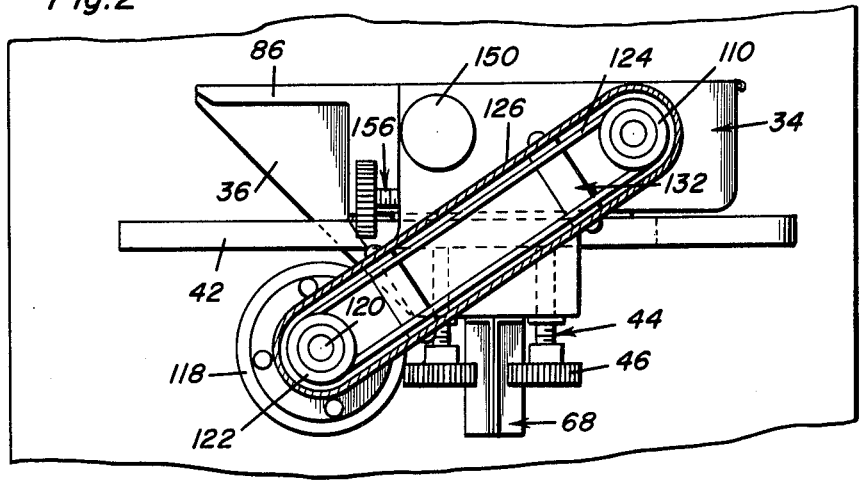
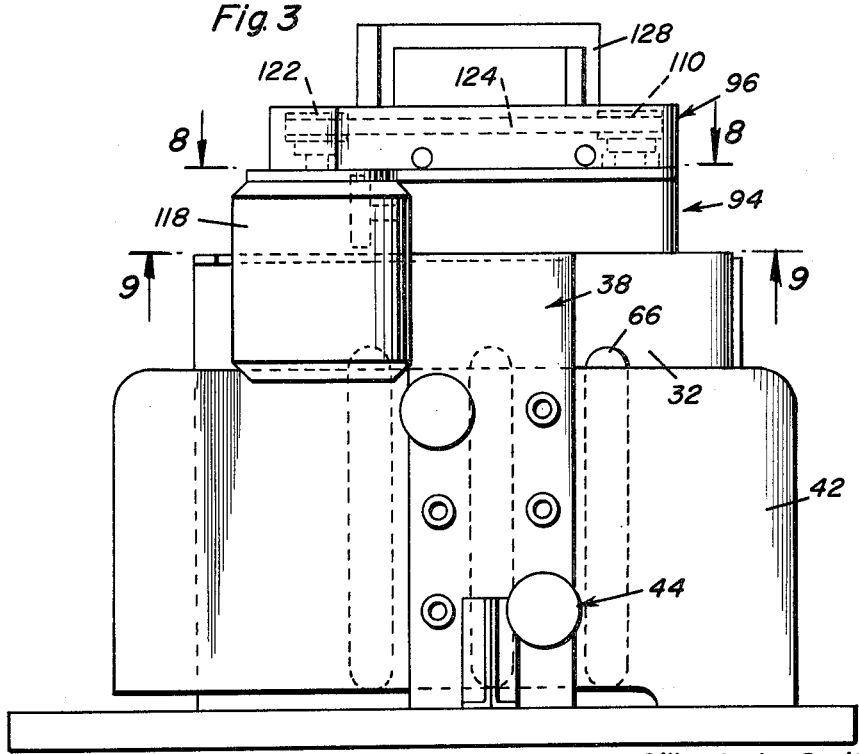

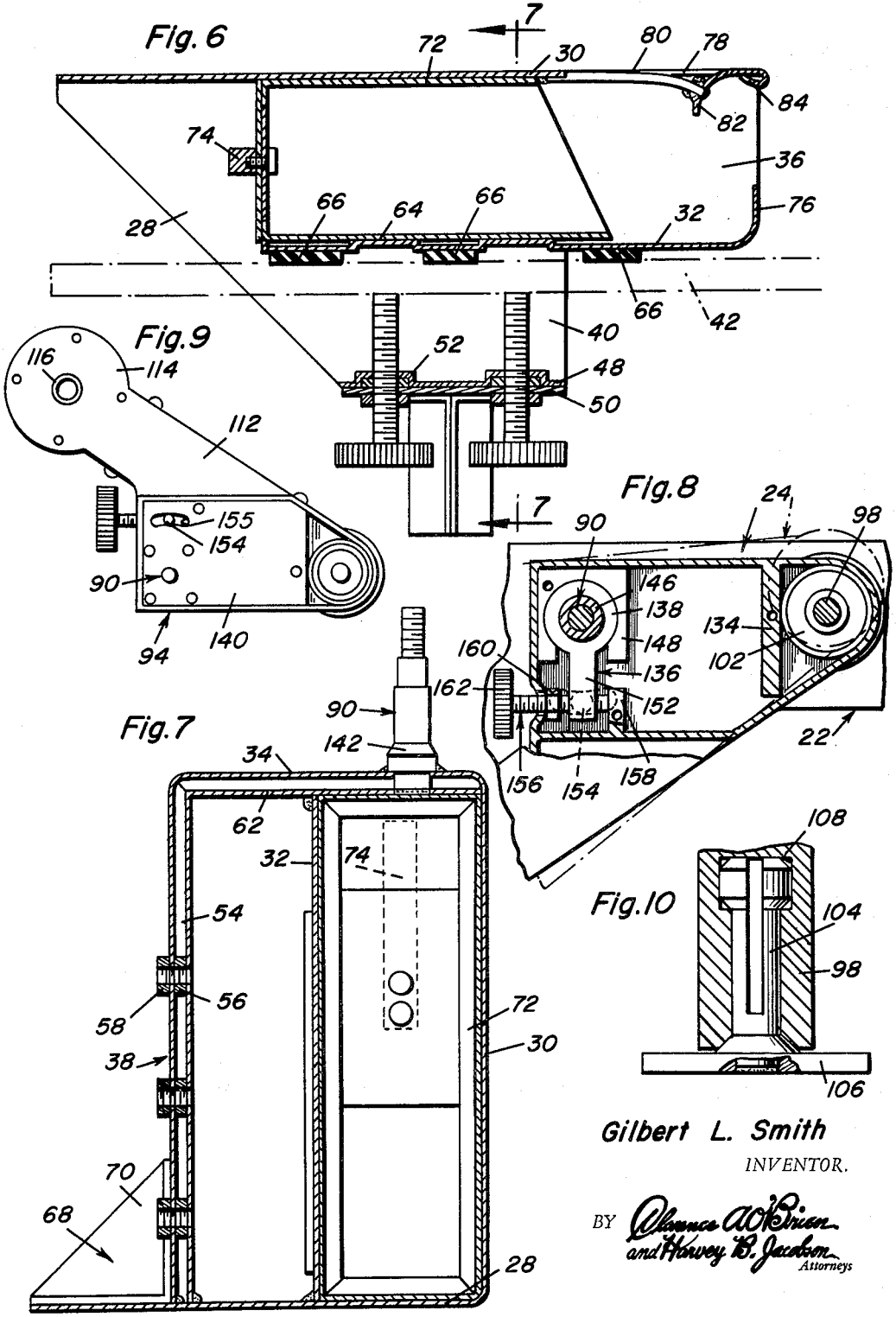

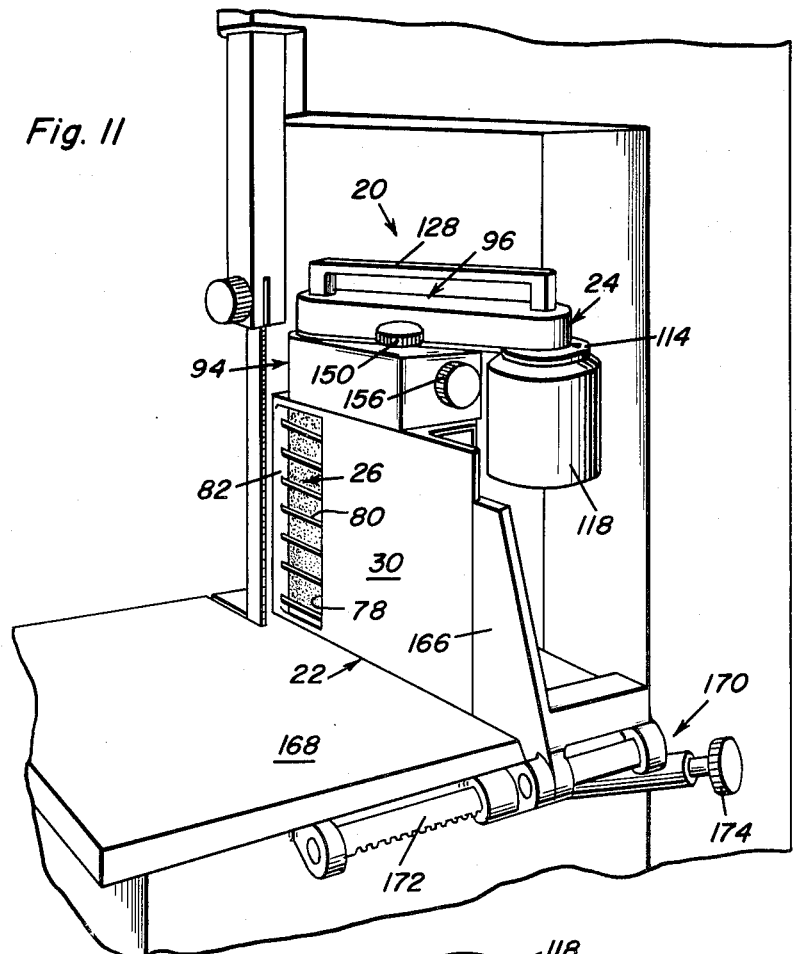
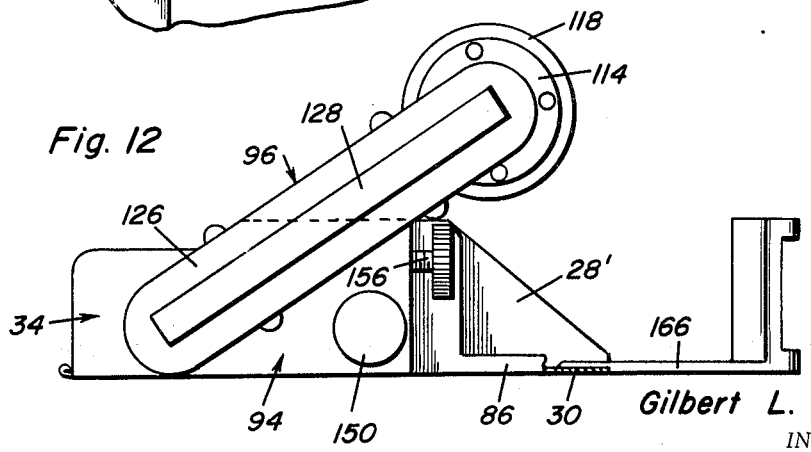

United States Patent Office 3,237,228
Patented Mar. 1, 1966

3,237,228
MEAT BRUSH AND CLEANER
Gilbert L. Smith, Peru, Ill., assignor to G. L. Smith Company, a corporation of Illinois
Filed July 2, 1965, Ser. No. 469,283
14 Claims. (Cl. 15—3.1)

The present invention is concerned with new and useful improvements in meat cleaning devices, and constitutes a continuation-in-part of co-pending application Serial No. 332,194, filed December 20, 1963, for Powered Meat Brush and Cleaner.

Accordingly, it is a primary object of the instant invention to provide a device, in the form of motor driven rotating brush, which is utilized in the cleaning of meat through the removal of any surface accumulation of bone dust, fat, marrow, or the like.

In conjunction with the above object, it is also a highly significant object of the instant invention to provide a meat brush which can be either contructed for convenient mounting on the conventionally provided guide associated with power meat saws, or if so desired, can be contructed integrally with the saw guide.

Similarly, it is an object of the instant invention to provide a meat brush which is equally adaptable for mounting, either vertically or horizontally, on a separate cleaning table.

Likewise, it is an object of the instant invention to provide a powered meat brush unit which incorporates means for collecting the brushed accumulation for subsequent removal, the accumulation being discharged from the brush itself by centrifugal force arising from the rate of rotation of the brush, this also tending to clean and maintain clean the brush itself.

Furthermore, it is an object of the instant invention to provide a meat cleaning device wherein the front or guide surface thereof can also be utilized in place of, or in conjunction with the conventional saw guide so as to direct the meat, subsequent to the cleaning thereof, into the meat saw itself.

In addition, it is an object of the instant invention to provide a cleaning device wherein the brush itself can be easily adjusted so as to vary the the amount of projection beyond the casing, thereby varying the degree of engagement between the meat and the brush.

Also, it is a significant object of the instant invention to provide a meat cleaning device which is of a relatively simple construction, highly rugged in nature, capable of being easily maintained, and simple to operate, normally requiring no more effort than is associated with the actual cutting of the meat.

Basically, in achieving the above objects, the device of the instant invention includes a casing having a horizontally elongated front panel and a relatively shorter rear panel defining a hollow chamber which in turn receives a vertically orientated rotatably mounted brush, as well as a clean-out drawer located so as to receive and contain the brushed material. In addition, spaced rearwardly of the chamber back panel is a vertical mounting plate through which mounting screws are engaged for effecting the clamping of a fixed member, such as a saw guide, against the back panel of the casing. The brush itself, selectively disposable through a vertical slot in the chamber defining portion of the front panel, is supported and suspended from an upper bearing which is in turn received within a first superimposed housing containing mechanism for varying the degree of projection of the brush, and a second housing thereabove containing the drive means for the brush and communicating with a side mounted electric motor, the actual adjustment of the brush itself being effected by a physical moving of the two housings relative to the casing itself. In a modified form, rather than being mounted on a saw guide through the mounting plate, the saw guide is formed integrally with the device as a continuation of the front wall thereof, with the entire unit being mounted on the saw table by the conventional guide mounting and adjusting means.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view of the meat cleaning device with portions broken away for purposes of illustration;

FIGURE 2 is a top plan view of the device with the upper portion of the upper housing removed for purposes of illustration;

FIGURE 3 is a rear elevational view of the device;

FIGURE 4 is a side elevational view of the device taken at the brush end thereof;

FIGURE 5 is a top plan view of the casing itself;

FIGURE 6 is an enlarged horizontal cross-sectional view through the casing and device mounting portion;

FIGURE 7 is a vertical cross-sectional view through the casing taken substantially on the plane passing along line 7—7 in FIGURE 6;

FIGURE 8 is an enlarged partial cross-sectional view taken substantially on a plane passing along line 8—8 in FIGURE 3 and illustrating the brush adjusting mechanism;

FIGURE 9 is a cross-sectional view taken substantially on a plane passing along line 9—9 in FIGURE 3;

FIGURE 10 is an enlarged sectional detail taken substantially on a plane passing along line 10—10 in FIGURE 1;

FIGURE 11 is a partial perspective view of a meat saw wherein the combination meat brush and cleaner of the instant invention has a saw guide integrally formed therewith so as to provide a meat guiding continuation of the forward face thereof, the entire unit being mounted on and adjustable along the saw table by any suitable means utilized in mounting conventional saw guides; and FIGURE 12 is a top plan view of the combination meat brush and saw guide of FIGURE 11 with the saw construction removed.

Referring now more specifically to the drawings, reference numeral 20 is used to generally designate the combination meat brushing and cleaning device comprising the instant invention. This device 20 consists basically of a casing 22 and a brush mounting and controlling unit 24 releasably mountable on the casing in a manner so as to locate the elongated brush 26 therein.

The casing 22 includes a flat bottom wall 28, an elongated vertical front wall 30, a rear wall 32 of the same height as, although of less length than, the front wall 30, and a top 34 of the same length as the rear wall 32 and spanning between the rear wall 32 and the corresponding portion of the front wall 30 so as to define, in conjunction with the bottom 28, an internal chamber 36.

With reference particularly to the form of the invention illustrated in FIGURES 1-7, it will be noted that a portion of the top 34 extends rearwardly of the back wall or panel 32 and terminates in a vertical mounting panel 38 laterally spaced from and paralleling the back wall 32. By the same taken, the bottom 28 also projects rearwardly from the rear wall 32 to approximately the vertical plane of the mounting panel 38 with the lower end of this panel 38 being fixed to the bottom 28, thereby providing in effect a sleeve portion 40 rearward of the rear wall for the reception therethrough of any fixed projection upon which the device 20 is to be mounted, for example the saw guide 42 normally associated with a conventional meat saw. The actual locking of the device 20 to the guide or member 42 is effected by a plurality of locking screws 44 threaded to the mounting plate 38 and selectively extensible across the sleeve portion for clamping engagement of the guide 42 against the rear face of the rear wall 32, the screws 44 including enlarged gripping heads 46 thereon so as to enable them to be easily manipulated. The mounting plate or panel 38 in effect consists of inner and outer laminations or layers 48 and 50 with the inner lamination 48 having inwardly offset rib portions 52 formed therein and extending the full height thereof, thereby rigidifying this panel 38 and providing an internal recess 54 within which screw receiving sockets or nuts 56 can be mounted, as by welding, these sockets 56 cooperating with similar external sockets 58 so as to provide for a stable threaded mounting of the corresponding locking screw 44.

The top 34, within the area of the mounting plate 38, also includes an inner reinforcing layer or lamination 60 which has depending ribs 62 forming continuations of the ribs 52 and continuing to the front wall 30. The back wall 32, while only consisting of a single layer, has inwardly offset rib portions 64 with the rear surface of the rear wall 32 having vertical cushioning strips 56 along the opposite sides thereof forming a cushioning and a gripping means against which the guide 42 or other similar fixed projection is to be clamped.

Stability is introduced into the device 20 by the provision of rearwardly extending leg 68 fixed to the mounting plate 38 and including a solid triangular bracing rib 70.

As will be appreciated from FIGURE 6, the bottom 28 of the casing, in addition to extending rearwardly to the locking plate 38 also projects at an angle therefrom to the outermost extremity of the front wall 30 at that end thereof which extends beyond the rear wall 32, thus in effect providing a landing laterally outward of one end of the chamber 36, such a landing also being present in the form of invention illustrated in FIGURE 12 and indicated by reference numeral 28'. This one end of the chamber 36 is closed by a removable clean-out drawer 72 having an exterior handle 74 thereon. The drawer 72, having substantially the same cross-sectional area as the chamber 36, is positioned on the platform portion of the bottom 28 and slid longitudinally into the chamber 36 for frictional engagement between the rear surface of the front wall 30 and the inner surfaces of the back wall ribs 64, the forward end of the drawer 72 having a projecting back portion in the manner of a scoop.

The second end of the chamber 36, opposite from the end selectively closed by the clean-out drawer 72, is partially closed by angularly curving a portion 76 of the rear wall 32 thereabout. The front wall 30, adjacent this second end of the chamber 36, includes a vertically elongated opening 78 therein, with a major portion of the front wall 30 being located to one side of the opening, this opening, as will best be appreciated from FIGURE 6, being located just forward of the forward open end of the drawer receptacle 72.

A plurality of guide bars 80 are provided substantially transversely across the opening 78 in vertically spaced relation to each other along the full height of the opening 78, these guide bars 80 being inclined slightly relative to the horizontal and slightly curved so as to form a gradual arcuate continuation of the adjoining major portion of the front wall 30. The guide bars 80 terminate in a sharp inwardly curved portion 82 of the minor portion of the front wall 30 which has the outer edge thereof reversely curved as at 84 so as to provide a smooth edge.

Referring again to the top 34, attention being directed to FIGURE 5, it will be noted that a portion 86 of this top projects laterally and forms in effect a reinforcing flange along the upper edge of a portion of the front wall 30 which projects laterally of the chamber 36. In addition, the top wall 34 is provided with an enlarged brush receiving hole or aperture 88 therethrough directly above that portion of the chamber 36 behind the front wall opening 78 and forward of the forward end of the drawer 72. Furthermore, a rigidly mounted vertical stud 90, at least the upper portion thereof being threaded, projects upwardly from the top wall 34 directly over the far rib 62 and adjacent the front wall 30, with a second smaller opening or hole 92 extending through the top 34 rearward of the stud 90 in alignment therewith over the rib 62.

Referring now to the brush mounting and operating unit 24, it will be noted that this basically includes a lower housing 94 and an upper housing 96. The upper end of the brush shaft 98, which projects above the spiral bristles 100 thereon which in turn terminate below the top 34, projects vertically through the lower housing 94 and into the upper housing 96. This upper end of the shaft 98 is rotatably fixed within suitable bearing means 102 which not only receives the shaft 98 but mounts or suspends the brush 26 itself for rotation, a suitable split shank retaining washer 104, having an enlarged disk-like head 106, noting FIGURE 10, being engaged within a suitable internally enlarged socket 108 within the lower end of the shaft 98 so as to retain the spiral bristle portion 100 thereon.

In order to effect the rotational driving of the brush 26, the upper end of the shaft 98, located within the upper housing 96, is provided with a power transmitting wheel, preferably in the nature of a positive drive pulley 110 fixed thereto. The floor 112 of the upper housing 96, a portion of this member also constituting the top of the lower housing 94, projects laterally outward from the lower housing 94 and terminates in a disk-like motor mounting portion 114 having a drive shaft receiving aperture 116 centrally therethrough. The actual power unit, generally an electric motor 118, is secured beneath this circular portion 114 and is suspended therebelow with the drive shaft 120 projecting through the opening 116 and having a drive wheel 122 fixed thereon and generally coplanar with the wheel or pulley 110. Finally, an endless belt 124 is drivingly engaged between the wheels 110 and 122 so as to effect a rotation of the brush 26 upon an energization of the motor 118. The actual housing 96 consists of an oblong open bottom cap-like member 126 having depending walls which surround the pulleys or wheels 110 and 122, and a top wall which has a lifting handle 128 fixed thereto. The housing cap 126 is fixed into position by suitable bolt means extending through the side walls thereof and into apertured vertical legs 130 of a pair of longitudinally spaced mounting clips 132 fixed to the floor 112.

Referring now specifically to the lower housing 94, attention is directed to the fact that this lower housing 94, in addition to incorporating the bearing means 102 for the supporting of the brush 26, also incorporates the mechanism whereby the adjustment of the projection of the brush 26 through the front wall opening 78 is achieved, this basically resulting from an actual pivoting of the entire unit 24 relative to the casing 22 about the stud 90.

In addition to that portion of the housing 94 within which the bearing means 102 receives and supports the brush shaft 98, this portion being defined by a partitioning wall portion 134, the housing 94 also has, at the opposite end thereof, a crank member 136. This crank member 136 includes an annular or ring portion 138 which receives the casing stud 90 therethrough, the removable bottom plate 140 of the lower housing 94 having a suitable aperture therethrough. As will be appreciated from FIGURE 1, the lower portion of the stud 90 has a frusto-conical enlargement 142, this enlargement 142 being seatingly received within a mating conical countersunk portion 144 in the ring portion 138 of the crank 136. The remaining portion of the member 90 within the lower housing 94 is surrounded by and rotatably received within an integral sleeve portion 146 which is in turn rotatably mounted within a bushing unit 148 fixed within the housing 94. The housing 94, and consequently the superimposed housing 96, is retained on the stud 90 by means of a suitable enlarged handgripping nut-like member 150 threaded on the upper end of the stud 90 with the mating conical portion 142 and conical seat 148 maintaining the housing 94 pivotally movable relative to the subjacent casing.

The remainder of the crank 136 consists of an elongated lever arm 152 projecting radially from the annular upper portion 138, this arm or arm portion 152 having, adjacent the outer end thereof, a lug 154 fixed thereto and projecting therefrom through an arcuate slot 155 in the bottom plate 140 and into the hole or aperture 92 in the top 34 of the casing 22. In addition, an elongated adjusting screw 156 projects laterally through the lower housing 94, this adjusting screw 156 being threadedly engaged transversely through the arm portion 152 above the lug 54 and continuing through the housing 94 into abutting engagement with an abutment wall 158, thereby limiting inward movement of the adjusting screw 156, outward movement thereof relative to the lower housing 94 being limited by an annular abutment 160, which may be in the form of a nut locked against rotation to the screw 156. In this manner, it will be appreciated that as the screw 156 is rotated, through the enlarged gripping head 162 thereon, the arm portion 152 of the crank 136 is moved between the abutments 158 and 160, these abutments limiting the movement of the crank 136 in opposite directions about the central stud 90. However, inasmuch as the lug 154 is received within the top wall hole 92, and inasmuch as the casing 22 itself is fixed to a rigid support, such as the saw guide 42, the actual movement which occurs is a pivotal movement of the upper and lower housings 94 and 96, along with the brush 26, as a unit about the stud 90, this movement in turn being utilized so as to adjust the projection of a longitudinally extending portion of the periphery of the brush through the front wall opening 78. This movement of the brush 26 is accommodated by the enlarged aperture 88 through the top 34, this opening 88 providing ample room for a pivotal movement of the upwardly projecting portion of the brush shaft throughout the range of movement contemplated. Incidentally, this movement of the upper unit 24 relative to the casing 22 is illustrated in phantom lines in FIGURE 8.

The specific form of the invention illustrated in FIGURES 11 and 12 differs from the form of the invention illustrated in FIGURES 1–7 only in the manner in which the device is to be associated with a saw guide. In this second form, the saw guide or saw guiding portion 166 is integrally affixed to the leading edge of the front wall 30, this being done either by welding the portion 166 to the edge of the wall 30 or actually forming both the front wall 30 and the guide portion 166 of a single piece of plate steel, or other suitable material. By incorporating the saw guide 166 into the device 20 itself, it will be appreciated that the previously described mounting unit, including basically the mounting panel 38 and locking screws 44, is no longer needed.

In view of the integral incorporation of the saw guide into the device 20, in the modification of FIGURES 11 and 12, it will be appreciated that the entire combined unit can be mounted upon the saw table 168 utilizing the conventionally provided saw guide mounting and controlling means 170, normally utilized in mounting a conventional saw guide. This control means 170 can for example include an elongated rack rod 172 mounted along the front edge of the table 168 along which the combination device can be walked or adjusted by a projecting pinion controlling handle 17.

From the foregoing it should be appreciated that a highly novel meat cleaning device has been defined. This device, in conjunction with either mounting means or an integral saw guide, consists basically of a casing and an upper brush mounting and operating unit releasably engaged with the casing in a manner so as to locate the brush therewithin, the brush being accessible to the meat being cleaned through a vertically elongated slot in the front wall of the casing. The upper unit, including the brush rotatably suspended therefrom, engages the subjacent casing by merely, upon centering the brush, slipping over a vertically projecting stud 90 and having a depending lug 154 thereon received in an aligned hole 92 in the top of the casing, after which an enlarged nut-like member 150 is screwed down on the projecting end of the stud 90, thereby pivotally locking the upper unit 24 to the casing 22. In this position, the entire upper unit 24, including the brush 26 suspended therefrom, is pivotally adjusted about the stud 90 through an adjusting screw 156 bearing against a crank arm 136 upon which the lug 154 is rigidly mounted, the reactant force against the pressure exerted on the lug 154 producing the pivoting of the entire upper unit about the stud 90. During rotation, the brush 26 spins about its own axis in a manner so as to direct the brushed material, accumulated from the meat drawn across the front wall opening 78, laterally into the clean-out drawer 72, the matter being in effect flung from the brush by centrifugal force, thereby also maintaining the brush relatively clean. The slightly arcuate configuration of the guide bars of the opening 78 insure a complete contact with the meat by the brush so as to effect a proper cleaning thereof, with the scooped shape of the inner edge of the drawer 72 collecting all of the brushed or scraped material. Finally, when one wishes to dismantle the device for cleaning purposes, only the enlarged nut-like member 150 need be removed, after which through the handle 128, the entire upper unit 24 is merely lifted away from the casing 22. Further, it will be noted that the motor 118 is suspended from a portion of the upper unit 24 generally parallel to the casing this motor 118 being mounted in a manner which provides no significant increase in the bulk of the unit, and in a manner which enables it to be simultaneously removed along with the upper unit 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A meat cleaning device comprising a casing, said casing defining a hollow chamber and including a generally flat front wall, an elongated transverse opening through said wall communicating with said chamber, an elongated brush, means rotatably mounting said brush within said chamber transversely of said front wall, a peripheral portion of said brush, along the entire length thereof, being projectable through said opening, means for varying the amount of projection of the brush through said opening, a major portion of said wall being located to one side of said opening so as to constitute a meat guiding surface, and locking means mounted on said casing rearwardly of the front wall, said locking means being selectively movable forward and rearward relative to the front wall so as to effect a clamped mounting of the device on a suitable structure, said chamber defining portion of said casing including a rear wall, the aforementioned clamped mounting being effected between the rear wall and the locking means located to the rear thereof.

2. The device of claim 1 wherein said casing includes a generally flat top, said brush including an elongated mounting shaft projecting longitudinally beyond a first end thereof, said top including an enlarged aperture therethrough freely receiving the projecting portion of brush shaft, said means rotatably mounting said brush including bearing means receiving that portion of the shaft above said top and rotatably mounting the brush thereby, and means engaged with the shaft for effecting a rotation of the brush about its own axis.

3. The device of claim 2 wherein said means for varying the amount of projection of the brush includes means pivotally mounting said bearing means and the brush mounted thereby for movement about a second axis parallel to and spaced from the brush axis, and means for effecting a pivotal adjustment of the bearing means and brush about the second axis, said adjustment being accommodated by the enlarged top aperture.

4. The device of claim 3 wherein said brush shaft projects above said bearing means, said means for effecting a rotation of the brush comprising a power transmitting wheel fixed to the shaft above the bearing means, a drive wheel located laterally of said first wheel, an endless drive engaged between said wheels, and a power unit engaged with said drive wheel and positioned therebelow along side said casing.

5. The device of claim 4 including a first housing receiving said bearing means and said means for pivotally mounting said bearing means, and a second housing superimposed on and secured to said first housing, said second housing receiving said means for effecting a rotation of the brush, and means releasably securing said first housing to the top of the casing whereby upon a release thereof both housings and the brush can be removed as a unit from the casing.

6. The device of claim 5 including a removable drawer closing that end of said casing chamber toward which the rotating brush, through centrifugal force, tends to discharge brushed matter.

7. The device of claim 5 including a plurality of laterally spaced guide bars spanning said chamber opening and forming a gradually arcuate continuation of the aforementioned major portion of the front wall, said guide bars being laterally spaced from each other along substantially the full length of the opening.

8. A meat cleaning device comprising a casing, said casing defining a hollow chamber and including a generally flat front wall, an elongated transverse opening through said wall communicating with said chamber, an elongated brush, means rotatably mounting said brush within said chamber transversely of said front wall, a peripheral portion of said brush, along the length thereof, being projectable through said opening, means for varying the amount of projection of the brush through said opening, a major portion of said wall being located to one side of said opening so as to constitute a meat guiding surface, locking means mounted on said casing rearwardly of the front wall, said locking means being selectively movable forward and rearward relative to the front wall so as to effect a clamped mounting of the device on a suitable structure, said casing including a generally flat top, an elongated mounting shaft projecting longitudinally beyond a first end of the brush, said top including an enlarged aperture therethrough freely receiving the projecting portion of brush shaft, said means rotatably mounting said brush including bearing means receiving that portion of the shaft above said top and rotatably mounting the brush thereby, and means engaged with the shaft for effecting a rotation of the brush about its own axis, said means for varying the amount of projection of the brush including means pivotally mounting said bearing means and the brush mounted thereby for movement about a second axis parallel to and spaced from the brush axis, and means for effecting a pivotal adjustment of the bearing means and brush about the second axis, said adjustment being accommodated by the enlarged top aperture.

9. A meat cleaning device comprising a casing, said casing defining a hollow chamber and including a generally flat front wall, an elongated transverse opening through said wall communicating with said chamber, an elongated brush, means rotatably mounting said brush within said chamber transversely of said front wall, a peripheral portion of said brush, along the entire length thereof, being projectable through said opening, means for varying the amount of projection of the brush through said opening, a major portion of said wall being located to one side of said opening so as to constitute a meat guiding surface, locking means mounted on said casing rearwardly of the front wall, said locking means being selectively movable forward and rearward relative to the front wall so as to effect a clamped mounting of the device on a suitable structure, said casing including a generally flat top, an elongated mounting shaft projecting longitudinally beyond a first end of the brush, said top including an enlarged aperture therethrough freely receiving the projecting portion of brush shaft, said means rotatably mounting said brush including bearing means receiving that portion of the shaft above said top and rotatably mounting the brush thereby, and means engaged with the shaft for effecting a rotation of the brush about its own axis, a housing surrounding and mounting said bearing means, said means for varying the amount of projection of the brush including a crank means pivotally mounted within the housing about a crank axis laterally spaced from the brush axis, a rigid stud projecting from said casing and being rotatably received through said crank axis, a rigid lug fixed to said crank means outward of the axis thereof, said lug being received through an aperture in said casing so as to prevent relative movement between the crank means and the casing, and adjustable means engaged between said housing and crank means adjacent said lug outward from the crank axis for varying the distance therebetween and thereby pivoting the housing about the crank axis.

10. A meat cleaning device comprising a casing, said casing defining a hollow chamber and including a generally flat front wall, an elongated transverse opening through said wall communicating with said chamber, an elongated brush, means rotatably mounting said brush within said chamber transversely of said front wall, a peripheral portion of said brush, along the entire length thereof, being projectable through said opening, means for varying the amount of projection of the brush through said opening, a major portion of said wall being located to one side of said opening so as to constitute a meat guiding surface, locking means mounted on said casing rearwardly of the front wall, said locking means being selectively movable forward and rearward relative to the front wall so as to effect a clamped mounting of the device on a suitable structure, said casing including a generally flat top, an elongated mounting shaft projecting lonigtudinally beyond a first end of the brush, said top including an enlarged aperture therethrough freely receiving the projecting portion of brush shaft, said means rotatably mounting said brush including bearing means receiving that portion of the shaft above said top and rotatably mounting the brush thereby, and means engaged with the shaft for effecting a rotation of the brush about its own axis, a housing surrounding and mounting said bearing means, said means for varying the amount of projection of the brush including an elongated member mounted at one end within the housing about an axis forming means projecting from the casing and spaced from the brush axis, means pivotally fixing said housing to said elongated member for movement of the housing about said axis forming means, means fixing the opposite end of said member to the casing so as to prevent relative movement therebetween, and adjustable means engaged between said housing and said elongated member adjacent the opposite end thereof for varying the distance therebetween and thereby pivoting the housing about the axis forming means.

11. A meat cleaning device comprising a casing, said casing defining a hollow chamber and including a generally flat front wall, an elongated transverse opening through said wall communicating with said chamber, an elongated brush, means rotatably mounting said brush within said chamber transversely of said front wall, a peripheral portion of said brush, along the entire length thereof, being projectable through said opening, means for varying the amount of projection of the brush through said opening, a major portion of said wall being located to one side of said opening, and a saw guide located outward of said major portion of said wall relative to the edge thereof outward of the brush opening, said saw guide including a planar guiding face integrally engaged with and forming a planar continuation of the flat front wall of the casing, said saw guide also incorporating conventional saw guide mounting structure for effecting a mounting of the integrally engaged saw guide and casing.

12. The device of claim 11 wherein said casing includes generally flat top, said brush including an elongated mounting shaft projecting longitudinally beyond a first end thereof, said top including an enlarged aperture therethrough freely receiving the projecting portion of brush shaft, said means rotatably mounting said brush including bearing means receiving that portion of the shaft above said top and rotatably mounting the brush thereby, and means engaged with the shaft for effecting a rotation of the brush about its own axis.

13. The device of claim 12 including a housing surrounding and mounting said bearing means, said means for varying the amount of projection of the brush including means mounting said housing on said casing for rotation of said housing relative to said casing about a second axis spaced from the brush axis, and adjusting means engaged between laterally spaced points on the casing and housing outward from the second axis, said adjusting means enabling a variation in the distance between the laterally spaced points and a corresponding pivoting of the housing about the second axis relative to the casing.

14. A meat cleaning device comprising a casing, said casing defining a hollow chamber and including a generally flat front wall, an elongated transverse opening through said wall communicating with said chamber, an elongated brush, means rotatably mounting said brush within said chamber transversely of said front wall, a peripheral portion of said brush, along the entire length thereof, being projectable through said opening, and means for varying the amount of projection of the brush through said opening, a major portion of said wall being located to one side of said opening so as to constitute a meat guiding surface, said casing including a generally flat top, said brush including an elongated mounting shaft projecting longitudinally beyond a first end thereof, said top including an enlarged aperture therethrough freely receiving the projecting portion of brush shaft, said means rotatably mounting said brush including bearing means receiving that portion of the shaft above said top and rotatably mounting the brush thereby, and means engaged with the shaft for effecting a rotation of the brush about its own axis, said means for varying the amount of projection of the brush including means pivotally mounting said bearing means and the brush mounted thereby for movement about a second axis parallel to and spaced from the brush axis, and means for effecting a pivotal adjustment of the bearing means and brush about the second axis, said adjustment being accommodated by the enlarged top aperture.

References Cited by the Examiner

UNITED STATES PATENTS

| 2,799,877 | 7/1957 | Scott | 15—3.1 |
| 3,037,224 | 6/1962 | Webster | 15—21 |

CHARLES A. WILLMUTH, *Primary Examiner.*

E. L. ROBERTS, *Assistant Examiner.*